(12) United States Patent
Minami

(10) Patent No.: US 10,903,517 B2
(45) Date of Patent: Jan. 26, 2021

(54) SULFIDE SOLID ELECTROLYTE AND METHOD OF PRODUCING THE SAME

(71) Applicant: Toyota Jidosha Kabushiki Kaisha, Toyota (JP)

(72) Inventor: Keiichi Minami, Shizuoka-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 65 days.

(21) Appl. No.: 15/901,116

(22) Filed: Feb. 21, 2018

(65) Prior Publication Data

US 2018/0269527 A1 Sep. 20, 2018

(30) Foreign Application Priority Data

Mar. 15, 2017 (JP) ................. 2017-050258

(51) Int. Cl.
| | |
|---|---|
| *H01M 10/00* | (2006.01) |
| *H01M 10/0562* | (2010.01) |
| *H01M 10/0525* | (2010.01) |
| *C03C 4/14* | (2006.01) |
| *C03C 3/32* | (2006.01) |
| *H01M 10/052* | (2010.01) |
| *C03C 10/00* | (2006.01) |

(52) U.S. Cl.
CPC ......... *H01M 10/0562* (2013.01); *C03C 3/323* (2013.01); *C03C 4/14* (2013.01); *C03C 10/00* (2013.01); *H01M 10/052* (2013.01); *H01M 10/0525* (2013.01); *C03C 2204/00* (2013.01); *H01M 2300/0068* (2013.01); *Y02E 60/10* (2013.01)

(58) Field of Classification Search
CPC ................................................ H01M 10/0562
See application file for complete search history.

(56) References Cited

U.S. PATENT DOCUMENTS

| | | |
|---|---|---|
| 4,419,421 A | 12/1983 | Wichelhaus et al. |
| 2016/0133989 A1 | 5/2016 | Suzuki et al. |
| 2016/0260963 A1 | 9/2016 | Suzuki |
| 2018/0269527 A1 | 9/2018 | Minami |

FOREIGN PATENT DOCUMENTS

| | | | |
|---|---|---|---|
| CN | 105324821 A | | 2/2016 |
| CN | 105938894 A | | 9/2016 |
| JP | S61035642 B2 | | 8/1986 |
| JP | 2014049361 A | * | 3/2014 |
| JP | 2015011898 A | | 1/2015 |
| JP | 2015146239 A | | 8/2015 |
| JP | 2018-156735 A | | 10/2018 |
| JP | 2020-092098 A | | 6/2020 |

OTHER PUBLICATIONS

Machine translation of JP2014049361 (Year: 2014).*

* cited by examiner

*Primary Examiner* — Milton I Cano
*Assistant Examiner* — Mary G Henshaw
(74) *Attorney, Agent, or Firm* — Dinsmore & Shohl LLP

(57) ABSTRACT

Disclosed is a sulfide solid electrolyte of high robustness in its production step and of high lithium ion conductivity, the sulfide solid electrolyte including Li, P, S, Br, I, and N as its constituent elements.

4 Claims, 3 Drawing Sheets

SULFIDE SOLID ELECTROLYTE AND METHOD OF PRODUCING THE SAME

CROSS-REFERENCE TO RELATED APPLICATIONS

The present application claims priority to Japanese Patent Application No. 2017-050258 filed on Mar. 15, 2017, the entire contents of which are incorporated in the present specification by reference.

FIELD

The present application discloses a sulfide solid electrolyte and a method of producing the sulfide solid electrolyte.

BACKGROUND

Sulfide solid electrolytes are known as solid electrolytes for lithium ion batteries, and various studies have been carried out in order to increase their performance.

For example, JP2015-011898 A (Patent Literature 1) discloses a technique of amorphizing a raw material composition that contains $Li_2S$, $P_2S_5$, LiI, and LiBr to form a glass, and thereafter carrying out a heating treatment to the glass to crystallize the glass. In Patent Literature 1, the lithium ion conductivity of the sulfide solid electrolyte that is the final product is improved by addition of LiBr in the raw material composition. JP2015-146239 A (Patent Literature 2) discloses a technique of amorphizing a raw material composition that contains $Li_2S$, $P_2S_5$, and $Li_3N$ to form a glass, and thereafter carrying out a heating treatment to the glass to crystallize the glass. In Patent Literature 2, $Li_3N$ works to increase the lithium amount in a sulfide solid electrolyte, and N in $Li_3N$ is discharged outside the system as $N_2$. As disclosed in JPS61-035642 B (Patent Literature 3), it is also possible to obtain a predetermined ion conductive material by mixing lithium nitride and lithium halide and carrying out a heating treatment to the resulting mixture.

SUMMARY

Technical Problem

The $Li_2S$—$P_2S_5$—LiI—LiBr based sulfide solid electrolyte disclosed in Patent Literature 1 still has room for improvement in increasing its lithium ion conductivity. According to the finding of the inventor of the present disclosure, the temperature at which a high ion conduction phase forms is low and the temperature range where the high ion conduction phase can exist is narrow with the sulfide solid electrolyte disclosed in Patent Literature 1. That is, when the glass disclosed in Patent Literature 1 is heated to a temperature no less than the temperature at which the glass crystallizes, its high ion conduction phase transfers to a low ion conduction phase with only a heating temperature slightly higher than the temperature at which the glass crystallizes, and there is a possibility that a sufficient lithium ion conductivity is not exerted with the sulfide solid electrolyte that is the final product. To avoid this, a strict temperature control is needed in the heating treatment, resulting in a large restriction of the heating treatment apparatus used for producing the sulfide solid electrolyte.

Solution to Problem

The inventor of the present application found that including N in the above-described sulfide solid electrolyte as a constituent element can solve the various problems described above.

That is, as a means for solving the above problems, the present application discloses a sulfide solid electrolyte comprising Li, P, S, Br, I, and N as its constituent elements.

The lithium ion conductivity of the sulfide solid electrolyte of the present disclosure may be no less than 5.2 mS/cm.

The sulfide solid electrolyte of the present disclosure may be produced for example by: amorphizing a raw material composition that contains $Li_2S$, $P_2S_5$, LiI, LiBr, and $Li_3N$ to obtain a solid electrolyte glass; and heating the solid electrolyte glass.

In the production method of the present disclosure, the raw material composition may contain greater than 0 mol % and no more than 3.82 mol % of $Li_3N$, assuming that the total of $Li_2S$, $P_2S_5$, LiI, LiBr, and $Li_3N$ is 100 mol %. In some embodiments, the raw material composition may contain greater than 0 mol % and no more than 2.66 mol % of Li3N, assuming that the total of $Li_2S$, $P_2S_5$, LiI, LiBr, and $Li_3N$ is 100 mol %.

Advantageous Effects

According to the finding of the inventor of the present application, including N with Li, P, S, Br, and I in a sulfide solid electrolyte as its constituent elements causes the lithium ion conductivity of the sulfide solid electrolyte to improve, compared to a case where N is not included. According to the finding of the inventor of the present application, including N with Li, P, S, Br, and I in a raw material composition for producing a sulfide solid electrolyte causes a temperature at which a high ion conduction phase forms to shift to a high temperature side in a heating treatment of the raw material composition, and the temperature range where the high on conduction phase can exist to broaden, compared to a case where N is not included. Not intending to be bound by theory, it is considered that N improves the thermal stability of the high ion conduction phase. This makes it possible to properly form the high ion conduction phase in the heating treatment, and to obtain a sulfide solid electrolyte of high lithium ion conductivity. In addition, there is no need of a strict temperature control in the heating treatment, resulting in a versatile heating treatment apparatus used for producing a sulfide solid electrolyte.

DETAILED DESCRIPTION OF EMBODIMENTS

1. Sulfide Solid Electrolyte

A feature of the sulfide solid electrolyte of the present disclosure is to include Li, P, S, Br, I and N as its constituent elements. In this case, for example, it is possible to achieve a high lithium ion conductivity of no less than 5.2 mS/cm.

In the sulfide solid electrolyte of the present disclosure, at least part of each constituent element forms an amorphous phase where the constituent elements are randomly bonded to one another, and at least part of each constituent element forms a high ion conduction phase as its crystalline phase. According to the finding of the inventor of the present application, the high ion conduction phase formed by these constituent elements is a crystalline phase similar to $Li_{10}GeP_2S_{12}$ phase. In the sulfide solid electrolyte of the present disclosure, including N as its constituent element leads to an improvement of the thermal stability of the high ion conduction phase, and the high ion conduction phase is sustained in a wider and higher temperature range, though detailed mechanism is unknown. In this way, the sulfide solid electrolyte of the present disclosure has a high robustness in its production step and can exert a high lithium ion conductivity.

In the sulfide solid electrolyte of the present disclosure, the element concentration of each constituent element is adjusted as long as the above-described lithium ion conductivity can be exerted. The element concentration of each constituent element depends on the composition ratio of the raw material composition described later.

The shape of the sulfide solid electrolyte of the present disclosure is not particularly limited. For example, the shape may be granulous or aggregatus. The sulfide solid electrolyte may be formed into various shapes by shaping means. The shape of the sulfide solid electrolyte is known to the person skilled in the art, and detailed descriptions thereof are omitted.

2. Production Method of Sulfide Solid Electrolyte

Figure 1:
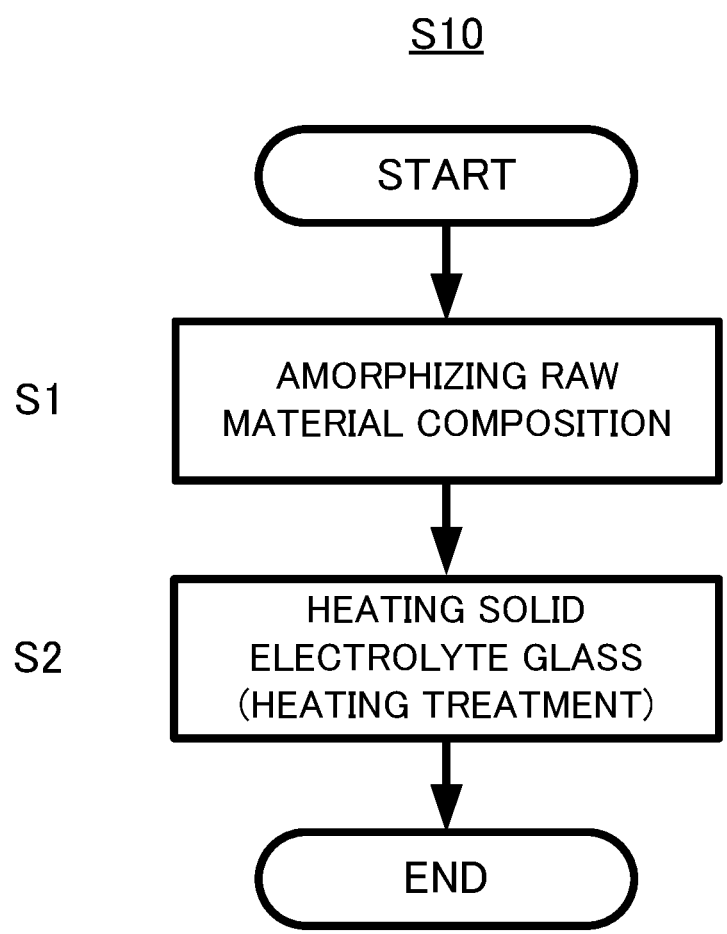
FIG. 1 is a flowchart to explain a method of producing a sulfide solid electrolyte.

The sulfide solid electrolyte of the present disclosure may be, for example, produced by a method shown by FIG. 1. That is, by a production method S10 of a sulfide solid electrolyte including a step S1 of amorphizing a raw material composition that contains $Li_2S$, $P_2S_5$, LiI, LiBr, and $Li_3N$ to obtain a solid electrolyte glass, and a step S2 of heating the solid electrolyte glass.

2.1. S1

S1 is a step of amorphizing a raw material composition that contains $Li_2S$, $P_2S_5$, LiI, LiBr, and $Li_3N$ to obtain a solid electrolyte glass. The raw material composition contains at least $Li_2S$, $P_2S_5$, LiI, LiBr, and $Li_3N$ as its raw materials, and may contain other raw materials in addition to these materials, as long as desired effects can be exerted.

The lithium ion conductivity of the sulfide solid electrolyte to be produced further increases by adjusting the content ratio of especially $Li_3N$ in the raw material composition. In particular, the raw material composition may include greater than 0 mol % and no more than 3.82 mol % of $Li_3N$, or even greater than 0 mol % and no more than 2.66 mol % of $Li_3N$, assuming that the total of $Li_2S$, $P_2S_5$, LiI, LiBr, and $Li_3N$ is 100 mol %. The lower limit is especially preferably no less than 1.13 mol %.

According to the finding of the inventor of the present application, the lithium ion conductivity of the sulfide solid electrolyte to be produced remarkably increases as long as the raw material composition contains $Li_3N$ even in a small amount. On the other hand, as far as the inventor of the present application found, the lithium ion conductivity tends to decrease to a certain degree when the raw material composition contains too much $Li_3N$. However, even though the content of $Li_3N$ increases, it is considered that adjusting content ratios and heating treatment temperature of other raw materials can achieve a sulfide solid electrolyte of high lithium ion conductivity.

The content ratio of the raw materials other than $Li_3N$ in the raw material composition is not limited to particular values. For example, assuming that the total of $Li_2S$, $P_2S_5$, LiI, LiBr, and $Li_3N$ is the basis (100 mol %), the raw material composition may include from 53.01 mol % to 56.25 mol % of $Li_2S$, or from 53.94 mol % to 54.87 mol % of $Li_2S$; from 18.75 mol % to 19.00 mol % of $P_2S_5$, or from 18.86 mol % to 18.93 mol % of $P_2S_5$; from 10.00 mol % to 10.13 mol % of LiI, or from 10.06 mol % to 10.09 mol % of LiI; and from 15.00 mol % to 15.20 mol % of LiBr, or from 15.08 mol % to 15.14 mol % of LiBr.

As $Li_3N$ increases in the raw material composition, the content ratios of the raw materials other than $Li_3N$ comparatively become smaller, as described above. In this point, in some embodiments, the content of $Li_2S$ may be made small among the raw materials other than $Li_3N$, and $Li_3N$ be contained more accordingly. This makes it possible to include N while keeping the lithium amount of the whole sulfide solid electrolyte. In addition, an effect of improving the robustness in the firing temperature is exerted, because the sensitivity of the conductivity to the firing temperature becomes low.

Amorphizing the raw material composition may be carried out for example by mechanical milling, melt quenching, and the like. In particular, mechanical milling may be used to amorphize the raw material. This is because the raw material composition can be processed at normal temperature and the production steps can be simplified. Melt quenching has limitations in its reaction atmosphere and reaction vessel, whereas mechanical milling has an advantage of easy synthesizing an intended solid electrolyte glass. Mechanical milling may be dry, or may be wet with various solvents. In particular, wet mechanical milling may be used, because the raw material composition can avoid from adhering to the wall surface of a vessel etc. and can be mixed more uniformly, which enables the whole raw material composition to be amorphized more properly, by wet mechanical milling. Mechanical milling is not particularly limited as long as it is a method of mixing the raw material composition with addition of mechanical energy. For example, ball mill, vibration mill, turbo mill, mechanofusion, disk mill, and the like may be utilized for mechanical milling. In some embodiments, a ball mill may be utilized for mechanical milling the raw material composition. In other embodiments, a planetary ball mill may be utilized for mechanical milling of the raw material composition. Use of a ball mill and/or a planetary ball mill may enable the solid electrolyte glass to be obtained efficiently. Each condition of mechanical milling may be set so as to amorphize the raw material composition.

The shape of the solid electrolyte glass obtained by S1 is not particularly limited. For example, the shape may be granulous or aggregatus. In view of uniformly heating the whole solid electrolyte glass and forming a high ion conduction phase more properly in S2 described later, granulous shape is preferable. Granulous solid electrolyte glass may be easily obtained for example by mechanical milling for the purpose of pulverization, with conditions different from the conditions of mechanical milling for amorphizing the raw material composition described above.

2.2. S2

S2 is a step of heating the solid electrolyte glass. According to the finding of the present application, including N in the raw material composition in addition to Li, P, S, Br, and I causes the temperature at which the high ion conduction phase forms in heating the raw material composition to shift to a high temperature side, and the temperature range where the high ion conduction phase can exist to broaden, compared to a case where N is not included. That is, the existence of N improves the thermal stability of the high ion conduction phase. Thus, in S2, there is no need to strictly control the heating temperature, and it is also possible to heat the solid electrolyte glass at a higher temperature than before.

According to the finding of the inventor of the present application, the temperature at which the high ion conduction phase forms in heating the raw material composition shifts to a higher temperature side and the temperature range where the high ion conduction phase can exist changes, as the amount of $Li_3N$ in the raw material composition increases. That is, the heating temperature in S2 may be determined depending on the amount of $Li_3N$ in the raw material composition in S2. For example, the heating temperature in S2 may be determined according to the adding amount of $Li_3N$, within the range of 215 degrees Celsius (° C.) to 270° C. It is also possible to express in advance the relationship between x (mol %) and Tmin and the relationship between x and Tmax as numerical formulas, wherein x is the adding amount of $Li_3N$ in the raw material composition, Tmin is the lower limit of the heating temperature, and Tmax is the upper limit of the heating temperature, to determine the heating temperature in S2 based on the numerical formulas.

The heating time in S2 is not limited to particular values as long as a desired high ion conduction phase can be produced. For example, the heating time is within the range of 1 minute to 24 hours, and preferably within the range of 1 minute to 10 hours.

The heating atmosphere in S2 may be an inert gas atmosphere (e.g. Ar gas atmosphere), or a reduced-pressure atmosphere (especially in a vacuum). This is because deterioration of the sulfide solid electrolyte (e.g. oxidation) can be prevented.

The heating method in S2 is not particularly limited. Various heating methods may be employed because a strict temperature control is not needed as described above. For example, common heating ovens may be used.

As described above, it is possible to obtain a sulfide solid electrolyte of high robustness in production and of high lithium ion conductivity, by the production method S10 that includes S1 and S2.

The sulfide solid electrolyte produced by the production method S10 includes Li, P, S, Br, I, and N derived from the raw materials as the constituent elements. Here, for example, at least part of N from $Li_3N$ in the raw material composition remains in the sulfide solid electrolyte, even though other part of N might vaporize and be discharged outside the system by going through S1 and S2. Considering this point, it is not necessary for each content (each element concentration) of Li, P, S, Br, and I in the raw material composition to be the same as each content (each element concentration) of Li, P, S, Br, I, and N in the sulfide solid electrolyte that is the final product.

EXAMPLES

Hereinafter the effect from the sulfide solid electrolyte of the present disclosure will be further explained with Examples.

1. Comparative Example 1

1.1. Amorphizing Raw Material Composition

A raw material composition consisting of 0.5503 g of $Li_2S$ (manufactured by Furuuchi Chemical Corporation), 0.8874 g of $P_2S_5$ (manufactured by Sigma-Aldrich Co. LLC.), 0.2850 g of LiI (manufactured by Nippoh Chemicals Co., Ltd.), and 0.2773 g of LiBr (manufactured by Kojundo Chemical Laboratory Co., Ltd.) was put in a zirconia pot (45 ml) with 5 mm diameter zirconia balls in it. Thereafter 4 g of dehydrated heptane (manufactured by Kanto Chemical Industry Co., Ltd.) was put into the pot, and the pot got a lid on. The pot with lid was set on a planetary ball mill (Fritch P-7), and subjected to mechanical milling at 500 rpm of rotation speed for 20 hours, whereby a solid electrolyte glass was obtained.

1.2. Heating Solid Electrolyte Glass

The obtained solid electrolyte glass was heated at a temperature no less than the temperature at which the solid electrolyte glass crystallizes, for 3 hours under an inert gas atmosphere, whereby a sulfide solid electrolyte was obtained.

2. Example 1

2.1. Amorphizing Raw Material Composition

A granulous solid electrolyte glass was obtained in the same manner as in Comparative Example 1, except that a raw material composition consisting of 0.5360 g of $Li_2S$, 0.8910 g of $P_2S_5$, 0.2861 g of LiI, 0.2785 g of LiBr, and 0.0084 g of $Li_3N$ (manufactured by Kojundo Chemical Laboratory Co., Ltd.) was used (raw material composition including 1.13 mol % of $Li_3N$ assuming that the total of $Li_2S$, $P_2S_5$, LiI, LiBr, and $Li_3N$ is the basis (100 mol %) was used).

2.2. Heating Solid Electrolyte Glass

The obtained solid electrolyte glass was heated at a temperature no less than the temperature at which the solid electrolyte glass crystallizes, for 3 hours under an inert gas atmosphere, whereby a sulfide solid electrolyte was obtained.

3. Example 2

3.1. Amorphizing Raw Material Composition

A granulous solid electrolyte glass was obtained in the same manner as in Comparative Example 1, except that a raw material composition consisting of 0.5264 g of $Li_2S$, 0.8935 g of $P_2S_5$, 0.2869 g of LiI, 0.2792 g of LiBr, and 0.0140 g of $Li_3N$ was used (raw material composition including 1.89 mol % of $Li_3N$ assuming that the total of $Li_2S$, $P_2S_5$, LiI, LiBr, and $Li_3N$ is the basis (100 mol %) was used).

3.2. Heating Solid Electrolyte Glass

The obtained solid electrolyte glass was heated at a temperature no less than the temperature at which the solid electrolyte glass crystallizes, for 3 hours under an inert gas atmosphere, whereby a sulfide solid electrolyte was obtained.

4. Example 3

4.1. Amorphizing Raw Material Composition

A granulous solid electrolyte glass was obtained in the same manner as in Comparative Example 1, except that a raw material composition consisting of 0.5167 g of $Li_2S$, 0.8959 g of $P_2S_5$, 0.2877 g of LiI, 0.2785 g of LiBr, and 0.0197 g of $Li_3N$ was used (raw material composition including 2.66 mol % of $Li_3N$ assuming that the total of $Li_2S$, $P_2S_5$, LiI, LiBr, and $Li_3N$ is the basis (100 mol %) was used).

4.2. Heating Solid Electrolyte Glass

The obtained solid electrolyte glass was heated at a temperature no less than the temperature at which the solid electrolyte glass crystallizes, for 3 hours under an inert gas atmosphere, whereby a sulfide solid electrolyte was obtained.

5. Example 4

5.1. Amorphizing Raw Material Composition

A granulous solid electrolyte glass was obtained in the same manner as in Comparative Example 1, except that a raw material composition consisting of 0.5021 g of $Li_2S$, 0.8996 g of $P_2S_5$, 0.2889 g of LiI, 0.2812 g of LiBr, and 0.0282 g of $Li_3N$ was used (raw material composition including 3.82 mol % of $Li_3N$ assuming that the total of $Li_2S$, $P_2S_5$, LiI, LiBr, and $Li_3N$ is the basis (100 mol %) was used).

5.2. Heating Solid Electrolyte Glass

The obtained solid electrolyte glass was heated at a temperature no less than the temperature at which the solid electrolyte glass crystallizes, for 3 hours under an inert atmosphere, whereby a sulfide solid electrolyte was obtained.

6. Conductivity Measurement

Figure 2:
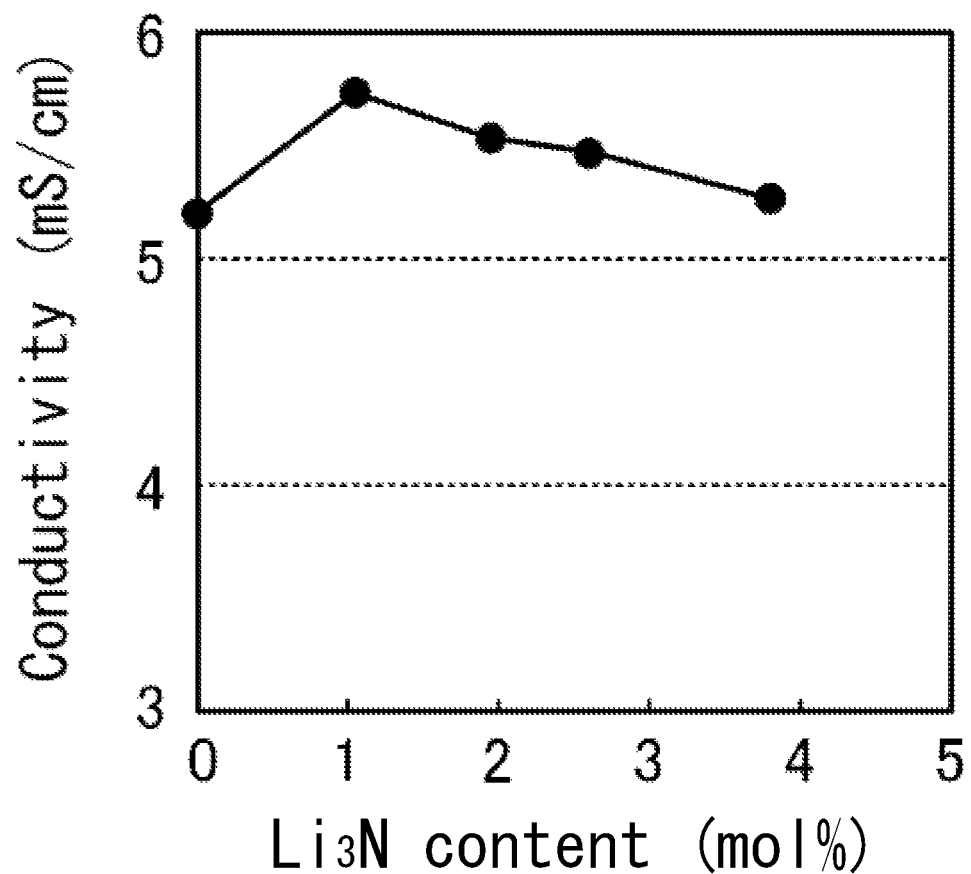
FIG. 2 is a graph to show the relationship between the amount of $Li_3N$ in a raw material composition for producing the sulfide solid electrolyte and the lithium ion conductivity of the sulfide solid electrolyte.

Each of the sulfide solid electrolytes according to Comparative Example 1 and Examples 1 to 4 was weighed to be 100 mg, and pressed at 4 t with a pellet molding machine, whereby pellets for measuring lithium ion conductivity were made. Each pellet was subjected to an AC impedance measurement to measure the resistance, and from the measured resistance and the thickness of the pellet, the lithium ion conductivity was calculated. FIG. 2 shows the relationship between the amount of $Li_3N$ in the raw material composition and the lithium ion conductivity of the sulfide solid electrolyte that is the final product.

As obvious from the results shown in FIG. 2, each of the sulfide solid electrolytes according to Examples 1 to 4 that includes Li, P, S, Br, I, and N as its constituent elements successfully improved its lithium ion conductivity compared to the sulfide solid electrolyte according to Comparative Example 1 that does not include N. In particular, each of the sulfide solid electrolytes according to Examples 1 to 4 that is the final product had a high value of no less than 5.2 mS/cm of lithium ion conductivity by including $Li_3N$ in the raw material composition.

Figure 3:
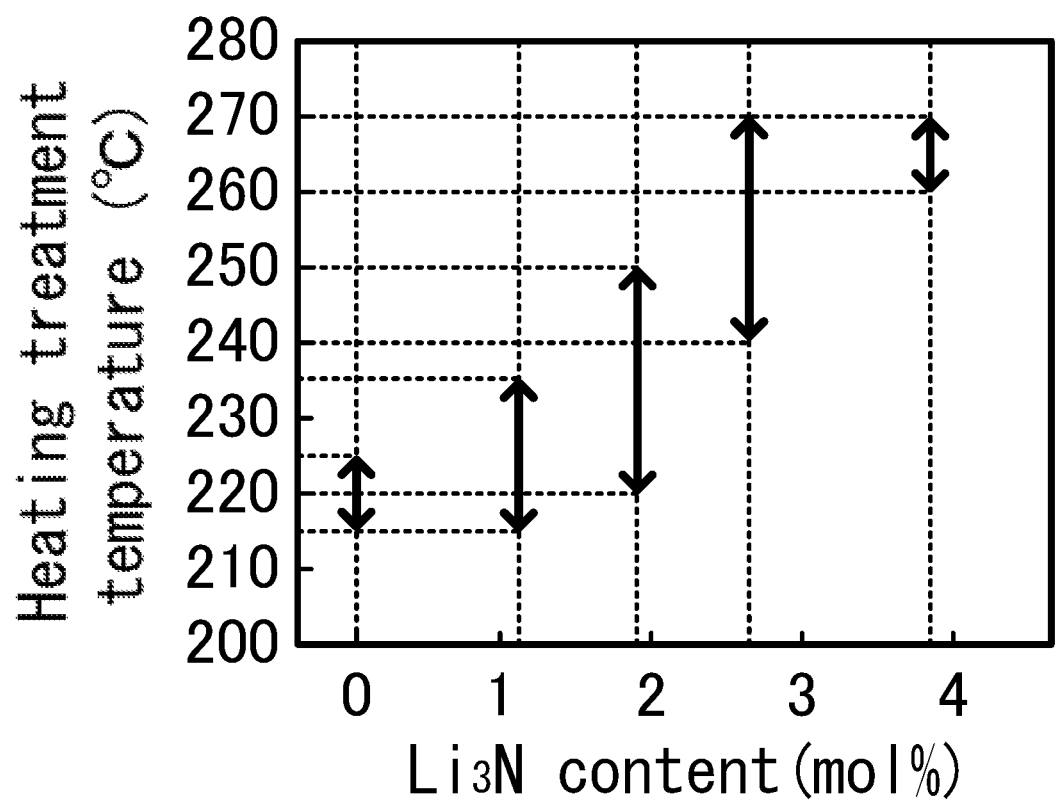
FIG. 3 is a graph to show the relationship between the amount of $Li_3N$ in the raw material composition for producing the sulfide solid electrolyte and the heating treatment temperature at which a high ion conductivity is shown.

7. Evaluation of Lower Limit and Upper Limit of Heating Treatment Temperature For each of Comparative Example 1 and Examples 1 to 4, the heating temperature of the solid electrolyte glass was varied, and the range of the heating treatment temperature where the sulfide solid electrolyte that is the final product can express a high ion conductivity (no less than 5.0 mS/cm) was checked. The results are shown in Table 1 and FIG. 3. The "lowest temperature" in Table 1 is the lower limit of the heating treatment temperature at which the sulfide solid electrolyte that is the final product can express a high ion conductivity, and the "highest temperature" is the upper limit of the heating treatment temperature at which the sulfide solid electrolyte that is the final product can express a high ion conduction. In FIG. 3, double headed arrows show the ranges of the heating treatment temperature where the sulfide solid electrolyte that is the final product can exert a high ion conductivity.

TABLE 1

| | Lowest Temperature (° C.) | Highest Temperature (° C.) |
|---|---|---|
| Comp. Example 1 | 215 | 225 |
| Example 1 | 215 | 235 |
| Example 2 | 220 | 250 |
| Example 3 | 240 | 270 |
| Example 4 | 260 | 270 |

As shown by the results shown in Table 1 and FIG. 3, it was found that in Comparative Example 1, the temperature at which the high ion conduction phase forms was low and the temperature range where the high ion conduction phase can exist was narrow, resulting in a phase transition of the high ion conduction phase to a low ion conduction phase when the solid electrolyte glass was heated at a high temperature. That is, it was found that in Comparative Example 1, a strict temperature control in the heating treatment was needed and there was a large restriction in the heating treatment apparatus used for producing the sulfide solid electrolyte.

On the other hand, it was found that the temperature at which the high ion conduction phase forms shifted to a higher temperature side as the content of $Li_3N$ in the raw material composition increased, as in Examples 1 to 4. Further, the temperature range where the high ion conduction phase can exist was successfully broadened by addition of $Li_3N$. That is, it was found that a sulfide solid electrolyte of high robustness in production was successfully obtained by the steps of amorphizing a raw material composition containing $Li_2S$, $P_2S_5$, LiI, LiBr, and $Li_3N$ to obtain a solid electrolyte glass and heating the obtained solid electrolyte glass.

INDUSTRIAL APPLICABILITY

The sulfide solid electrolyte of the present disclosure is applicable for example as a solid electrolyte for all-solid-state lithium ion batteries. The all-solid-state lithium ion batteries may be used as large on-board power sources for vehicles. The all-solid-state lithium ion batteries may also be applied as emergency power sources, and consumer power sources.

What is claimed is:

1. A method of producing a sulfide solid electrolyte comprising:
   amorphizing a raw material composition that contains $Li_2S$, $P_2S_5$, LiI, LiBr, and $Li_3N$ to obtain a solid electrolyte glass; and
   heating the solid electrolyte glass at a temperature of from 240° C. to 270° C. to produce the sulfide solid electrolyte comprising Li, P, S, Br, I, and N as its constituent elements,
   wherein the raw material composition contains greater than 0 mol % and no more than 3.82 mol % of $Li_3N$, assuming that the total of $Li_2S$, $P_2S_5$, LiI, LiBr, and $Li_3N$ is 100 mol %.

2. The method according to claim 1, wherein the raw material composition contains greater than 0 mol % and no more than 2.66 mol % of $Li_3N$, assuming that the total of $Li_2S$, $P_2S_5$, LiI, LiBr, and $Li_3N$ is 100 mol %.

3. The method according to claim 1, where the sulfide solid electrolyte has a lithium ion conductivity of no less than 5.2 mS/cm.

4. A method of producing a sulfide solid electrolyte, the method comprising:

amorphizing a raw material composition to produce a solid electrolyte glass, the raw material composition comprising:
25.9 wt. % $Li_2S$;
44.8 wt. % $P_2S_5$;
14.3 wt. % LiI;
13.9 wt. % LiBr; and
1.0 wt. % $Li_3N$, where the wt. % is based on the total weight of $Li_2S$, $P_2S_5$, LiI, LiBr, and $Li_3N$; and
heating the solid electrolyte glass at a temperature of from 240° C. to 270° C. to produce the sulfide solid electrolyte, where the sulfide solid electrolyte has a lithium ion conductivity of no less than 5.2 mS/cm and wherein the sulfide solid electrolyte comprises Li, P, S, Br, I, and N as its constituent elements.

* * * * *